United States Patent [19]

Pollock

[11] Patent Number: 5,425,329
[45] Date of Patent: Jun. 20, 1995

[54] BIN FILL INDICATOR

[76] Inventor: Eugene B. Pollock, Rte. 1, Box 56, Assumption, Ill. 62510

[21] Appl. No.: 4,837
[22] Filed: Jan. 19, 1993
[51] Int. Cl.⁶ ............................................. G01F 23/00
[52] U.S. Cl. ................................. 116/227; 116/201; 116/303
[58] Field of Search ............ 73/290 R; 116/227, 201, 116/282, 285, 303, 278; 141/94, 95

[56] References Cited

U.S. PATENT DOCUMENTS

| 805,102 | 11/1905 | Swanson | 116/303 |
|---|---|---|---|
| 1,504,211 | 8/1924 | Butler | 116/303 |
| 2,623,492 | 12/1952 | Rath | 116/227 |
| 3,279,078 | 10/1966 | Skalka | 73/290 R |
| 3,290,938 | 12/1966 | Miller | 73/290 |
| 3,401,562 | 9/1968 | Reany | 73/290 R |
| 3,443,437 | 5/1969 | Skalka | 73/290 |
| 3,542,982 | 11/1970 | Gruber | 200/61.21 |
| 3,685,356 | 8/1972 | Zimmerman | 73/290 R |
| 3,933,041 | 1/1976 | Hyer | 73/290 R |
| 4,318,624 | 3/1982 | Jett | 366/349 |
| 4,627,378 | 12/1986 | Manness et al. | 116/229 |
| 4,997,013 | 3/1991 | Peckels | 116/227 X |

FOREIGN PATENT DOCUMENTS

| 20973 | 8/1905 | Austria | 116/303 |
|---|---|---|---|
| 592273 | 2/1960 | Canada | 116/282 |
| 1131836 | 6/1962 | Germany | 116/303 |

OTHER PUBLICATIONS

E-Z Eye Product Brochure; LTJ Enterprises pp. 1, 2; 1988.
Sure Site Product Brochure, J. D. Lawson, Inc. pp. 1, 2; 1987.

Primary Examiner—William A. Cuchlinski, Jr.
Assistant Examiner—Willie Morris Worth
Attorney, Agent, or Firm—Polster, Lieder, Woodruff & Lucchesi

[57] ABSTRACT

Fill indicator apparatus (10) for use in a feed bin (B) to visually indicate the level to which the bin is filled witch feed (F). A first visual indicator (12) includes a first flag (18) positioned externally of the bin and movable linearly along the side of the bin. The flag is movable to a reference position prior to the bin being filled, and the flag subsequently moves from one position to another as feed is taken from the bin. The subsequent positions of the flag represent the level of feed remaining in the bin. A second and separate visual indicator (14) includes a second flag (22) also positioned externally of the bin. This second flag is movable in response to an increasing level of feed in the bin, as it is being filled, to provide a visual indication of the level to which the bin is filled. This helps prevent spillage.

54 Claims, 4 Drawing Sheets

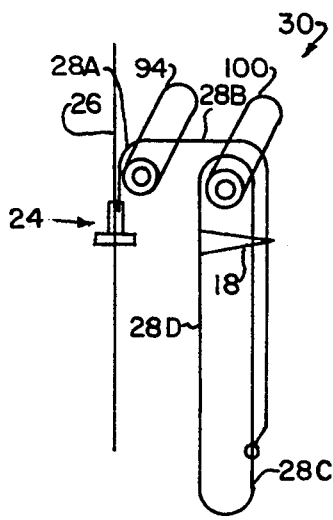
FIG.8A.
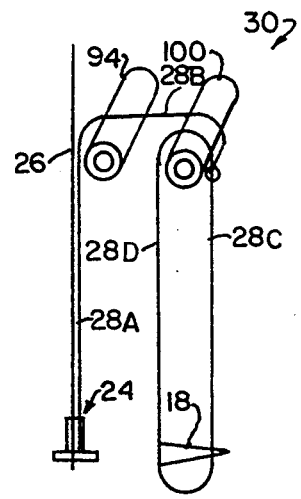
FIG.8B.
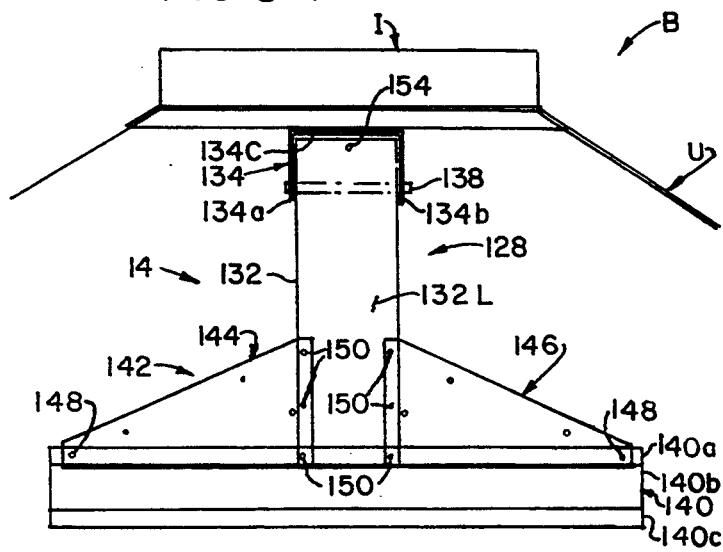
FIG.9.
FIG.10.

BIN FILL INDICATOR

BACKGROUND OF THE INVENTION

This invention relates to bulk feed tanks or bins for storing a dry, fluent material, for example, grain or ground corn products fed to livestock, and, more particularly, to indicators which quickly and accurately determine the level of feed in the tank or bin.

Bulk feed tanks are used on farms, feed lots, poultry houses, and similar locations to store the grain or other feed which is to be fed to livestock. Typically, the bin is elevated some distance above the ground and has an opening in its top through which grain is poured into the bin. A conveyor, such as an auger-type conveyor, is used to move feed from a delivery truck into the tank. The bin has an outlet formed at its bottom for the feed to fall, by gravity, into a conveyance, such as another auger conveyor, by which it is delivered to a poultry house, swine pen, or other feed site. In many operations, large quantities of feed are used. This means a bin is refilled every second or third day. Also, many operations have multiple bins some of which will be fuller than others and all of which must be monitored for feed level so the refilling operations can be organized for efficient refilling.

Because feed bins are elevated and made of metal, it is not easy to determine the level of feed in them. As a practical matter, the farmer or feed lot operator wants to know sufficiently far in advance when the quantity of stored feed is running low so he can arrange for delivery of more feed before he runs out. On the other hand, when the bin is being filled, the operator of the feed delivery truck needs to know when the bin is topping out so he can stop the loading conveyor before there is any spillage. In some operations, the bins have associated scales which provide readings to a central location. This allows the operator to determine how much feed has been removed from the bins so he can schedule filling operations accordingly. However, such operations are the exception. In most operations, the way to check feed level is to simply have someone climb a ladder and peer into the top of the bin. However, this method is impractical. If there are a number of bins, then every time an unloading occurs, someone must climb up the ladder and check the level to see if a refill point has been reached. During filling, the operator would be constantly up and down trying to insure he stopped the conveyor at the right time. If he had an assistant, the cost of operating the bin would increase. In either case, a great deal of reliance would be placed on the observer's ability to accurately gauge the fill level. Further, climbing up and down a ladder could be hazardous during inclement weather. Clearly, it would be advantageous to be able to readily determine the bin fill level from the ground. Hatches or covers for the top opening which are operable from the ground are currently available; see, for example, our co-pending application Ser. No. 07/811,615, filed Dec. 23, 1991, so there is currently no need for anyone to be climbing up the bin.

Various efforts have previously been made to provide a bin fill indicator which is readily observable by someone standing on the ground so they can determine the fill level without having to climb up the bin. See, for example, U.S. Pat. Nos. 4,936,245, 4,627,378, 3,542,982, 3,443,437, 3,290,938, and 3,279,078. While each of these prior art patents provides some type of fill level indication, none address the dual need as outlined above. In addition, certain of the patents have other drawbacks as well.

What would be helpful, therefore, is a bin fill indicator which is simple and reliable in operation and provides an accurate indication of the level of material in the bin both during filling and as the bin is unloaded.

SUMMARY OF THE INVENTION

Among the several objects of the present invention may be noted the provision of fill indicator apparatus for use in bulk feed tanks for providing a relatively accurate and readily observable indication of the level of material in the tank;

The provision of such a fill indicator which is readily visible by the operator of a feed delivery truck during filling so as to stop the delivery of feed into the tank as the tank is completely filled without the spillage of feed;

The provision of such indicator apparatus for use in bins holding fluid or flowable granular materials such as various types of feed and grain used to feed livestock;

The provision of such indicator apparatus which is easily installed;

The provision of such indicator apparatus to show the level of feed in the bin without the necessity of an operator climbing atop of bulk feed tank;

The provision of such indicator apparatus including two indicators one of which is used to indicate the level of feed when the bin is filled, and the other of which indicates the level of feed as the bin is emptied;

The provision of such indicators to provide indications based on the angle of repose of feed in the bin;

The provision of such indicators which are installable in many different styles of existing bulk feed tanks;

The provision of such indicators to be large, visual indicators which are easily seen at a distance;

The provision of such indicator apparatus to be of material which is not harmful to the feed or the animals consuming it;

The provision of such indicators which are sufficiently sturdy to not be effected by the elements, and dust and dirt; and, The provision of such indicators which are relatively inexpensive, yet save the user considerable time and expense by letting him know when the feed level is sufficiently low the bin needs refilling, and when the bin is substantially full, during refilling so there is no spillage.

In accordance with the invention, generally stated, fill indicator apparatus of the present invention is for use with a bulk feed tank or other bin to indicate the level to which the tank is filled with feed. A first visual indicator includes a first flag positioned externally of the tank and movable vertically along the side of the tank. The flag is movable to a reference position prior to the bin being filled, and the flag subsequently moves from one position to another as feed is taken from the tank. These subsequent positions of the flag represent the level of feed remaining in the bin. A second and separate visual indicator includes a second flag also positioned externally of the tank. This second flag is movable in response to the increasing level of feed in the tank, as it is being filled, to provide a visual indication of the level to which the tank is filled. This helps prevent spillage. In addition to their use together, either indicator can be installed separately in a tank, if desired. A method of bin fill indication is also described. Other objects and features will be in part apparent and in part pointed out hereinafter.

BRIEF DESCRIPTION OF THE DRAWINGS

FIGS. 8A and 8B are schematic views of a loop arrangement of a cable by which movement of an indicator flag corresponds to lowering of the feed level from a full level (FIG. 8A) in the bin as the bin is emptied;

FIG. 9 is an end view of a paddle and blade installed proximate the peak of a bin as part of a second indicator for indicating the bin fill level when the bin is being filled;

FIG. 10 is a partial sectional view of an upper portion of the bin illustrating the installation of the paddle inside the roof of the bin and a wand of the second indicator on the outside of the bin;

Corresponding reference characters indicate corresponding parts throughout the drawings.

DESCRIPTION OF A PREFERRED EMBODIMENT

Figure 1:
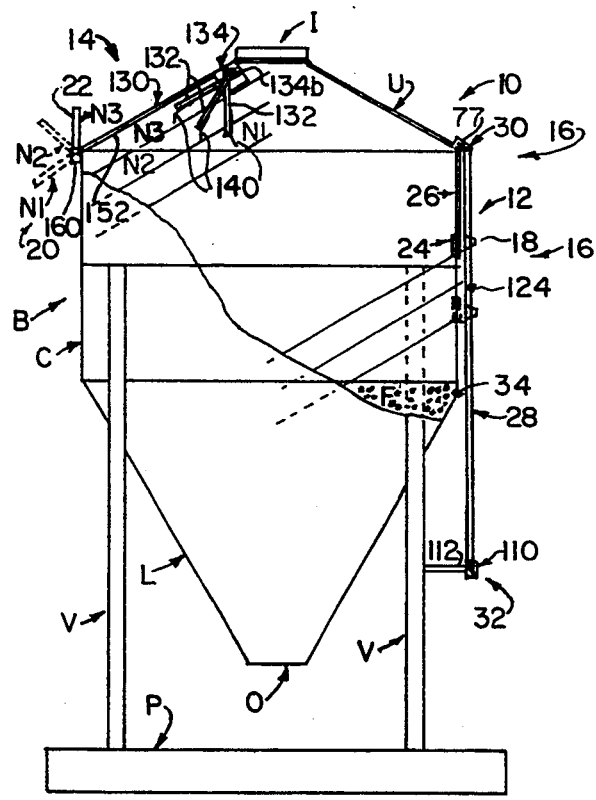
FIG. 1 is an elevational view, partly in section, of a bulk feed tank or bin utilizing fill level indicators of the present invention.

Referring to the drawings, a bulk feed tank or a bin B is shown in FIG. 1. The bin is used for storing a fluent material, such as granular feed F for livestock or poultry. While the invention to be described is particularly useful to indicate the fill level of bin B, it will be understood that the invention is equally useful when installed in other storage containers, feed tanks, hopper tanks, bulk storage hoppers, etc., in which fluid material may be stored. As shown in FIG. 1, bin B comprises a central hollow cylindrical section C, an upper, hollow conical section U surmounting section C, and a lower, hollow conical section L depending from section C. The sections are made of a galvanized iron. An inlet opening I is formed at the top of section U. The opening is normally closed by a hatch (not shown). Feed stored in the bin is deposited in it through the inlet. An outlet opening O is formed at the bottom of section L for the feed to discharge from the bin by gravity. Again, a hatch (not shown) normally closes the outlet. Bin B is supported above the ground such that the inlet is typically 18'-20' above ground level. For this purpose, a pad P is constructed at ground level with vertical legs V erected at the corners of the pad.

To fill the bin, a conveyor (not shown) such as an auger conveyor conveys the feed from a transport truck up to inlet I. The feed then spills out of the end of the conveyor into the bin. Feed from within the bulk feed tank is conveyed to a feeding system or the like by an auger conveyor or the like having its inlet at the bottom of the bulk feed tank. On farms, feed lots, or wherever substantial quantities of feed are used, bin B may be filled and emptied within a very short period of time. It is important in these uses that the operator be able to readily tell how much feed is in the bin. On the one hand, he wants to be able to reorder feed so it is delivered before the bin is emptied. On the other hand, when the bin is being filled, he wants to know when the bin is full. If the person operating the fill conveyor cannot tell how full the bin is, he may inadvertently overfill it, causing feed to spill and be wasted.

Fill indicator apparatus 10 of the present invention is for use in a storage container, such as a bin or bulk feed tank B, to indicate the fill level of the bin. Apparatus 10 includes a first visual indicator means indicated generally 12, and a second indicator means indicated generally 14. Means 12 includes a first visual indicator 16 which is positioned externally of bin section C and is movable relative to the sidewall of bin section C. Indicator 16, which comprises a pennant or flag 18, is movable to a reference position (position P1 in FIG. 2) when the bin is filled. The flag is linearly or vertically movable with respect to the side of the bin and is subsequently moved from one position to another (positions P2 and P3 in FIG. 2) as feed is withdrawn from the bin. The subsequent positions of the flag therefore represent the level of the remaining feed.

Means 14 of apparatus 10 includes a second visual indicator 20 which is also positioned externally of the container. Indicator 20 comprises a rod or wand 22 which is located adjacent the end of bin B and is rotatable between a "not full" position (N1) and a "full" position (N3). Means 14 is responsive to the increasing level of feed in bin B, when the bin is being filled, to provide a visual indication of the level to which the bin is filled. The first indicator means 12 therefore enables the farmer/operator to timely order new feed for delivery to the container; while the second indicator means 14 helps prevent the bin from being overly filled.

Figure 2:
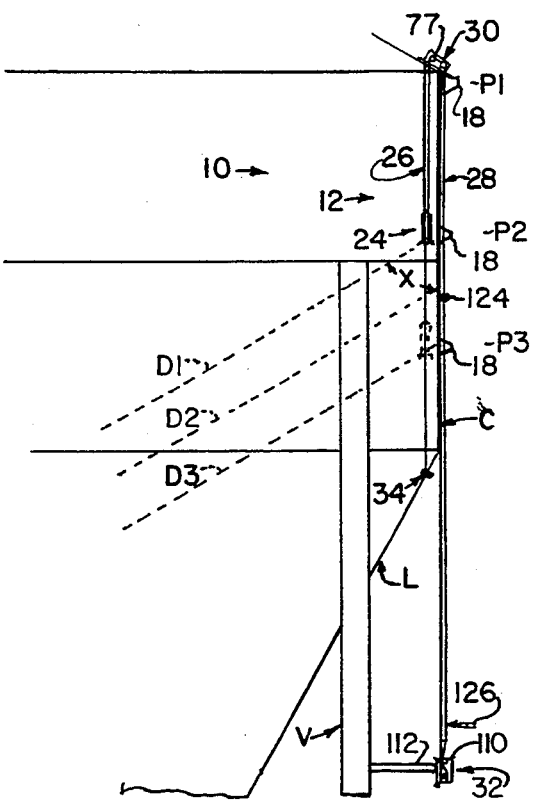
FIG. 2 is a partial elevational view of the bulk feed tank on an enlarged scale illustrating one of the indicators which is used to indicate the level of feed as the tank is emptied.

Referring to FIGS. 2-8, means 12, in addition to indicator 14, includes a weight assembly 24, a guide cable 26 for guiding movement of the weight assembly, a second cable 28 which is connected both to the weight assembly and the flag, first and second guide assemblies, 30, 32 which are installed on the outside of the bin, and an anchor 34 for one end of cable 26. It will be understood that cables 26 and 28 can be either rope, wire, or chain. Referring to FIG. 2, weight assembly 24 is installed within bin B. The weight assembly is carried by cable 26 and the bottom of the weight assembly rests upon the top of the feed. As indicated by the dotted lines D1-D3 in FIG. 2, as feed pours out through outlet O in the bin, the feed toward the outer wall of the bin angles downwardly toward the outlet. The angle X between the outer layer of feed and the sidewall of bin section C is called the angle of repose. Cable 26 insures that weight assembly 24 moves vertically within the bin, with the base of the assembly resting upon the top of the feed; but that the assembly does not shift one way or the other as the feed flows out and the angle of repose changes.

Figure 3:
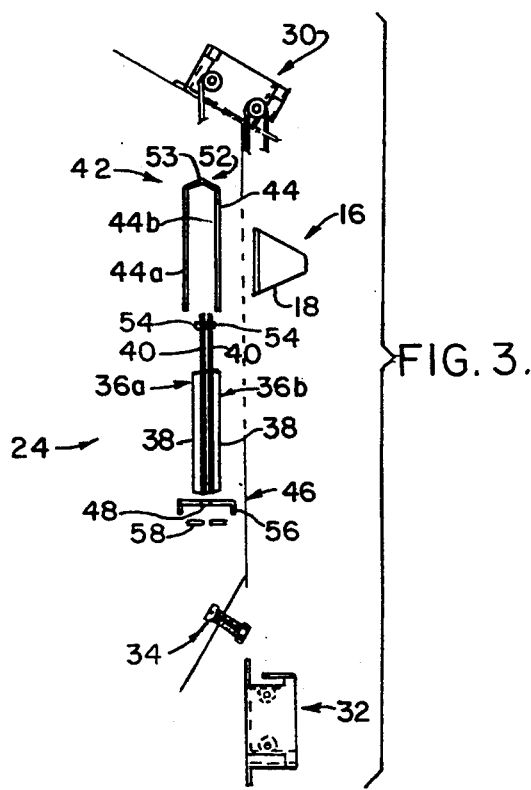
FIG. 3 is an exploded view of the indicator of FIG. 2 illustrating the various components comprising the indicator assembly.

As shown in FIG. 3, weight assembly 24 first includes a pair of weights 36a, 36b. Each weight comprises a rectangular plate 38 of galvanized steel, for example. Each plate is attached to a rod 40 whose length exceeds that of the plates so to extend both above and below the plates as shown in FIG. 5. Instead of weights 36a, 36b, the weight assembly could include a sleeve (not shown) in which metallic rods, metal washers, etc. could be placed to add weight to the assembly. A weight housing 42 includes an inverted V-shaped frame 44 having elongate legs 44a, 44b. The spacing between the legs is such that the weights 36a, 36b are captured therewithin when assembly 24 is put together. A base 46 of the assembly can be either rectangular or circular in shape. The base includes a central bore 48 through which guide cable 26 extends. It also includes spaced openings 50a, 50b for the lower ends of the respective rods 40 to extend. Frame 44 has a collar 52 at its upper end. The collar has central opening 53 through which cable 26 extends. Tabs 54 are affixed to the upper ends of the rods 40. The lower ends of the rods are inserted through the respective openings in base 46. When assembly 24 is formed, the frame is installed such that the lower end of its arms rest upon the upper surface of the base. The tabs at the upper ends of the rods bear against the inwardly angled upper ends of the frame legs to keep the weights in place. Base 46 also has a circumferentially extending flange 56 which depends from the base. A washer 58 is sized to fit within the flange and the underside of the base. The washer has appropriate openings for cable 26 and rods 40. Base 46 also has an opening 60 for one end of cable 28. As seen in FIG. 5, this end of the cable is routed through opening 60, and a corresponding opening in the washer. A cable clamp 62 is then attached to the end of the cable to keep it from coming loose. The clamp also serves to hold washer 58 in place. If the cable is a rope, the end of the rope can be knotted to secure it in place. The knot would also keep washer 58 in place. Weight assembly 24 can also be a molded assembly in which the base and frame, for example, are integrally formed.

Figure 4:
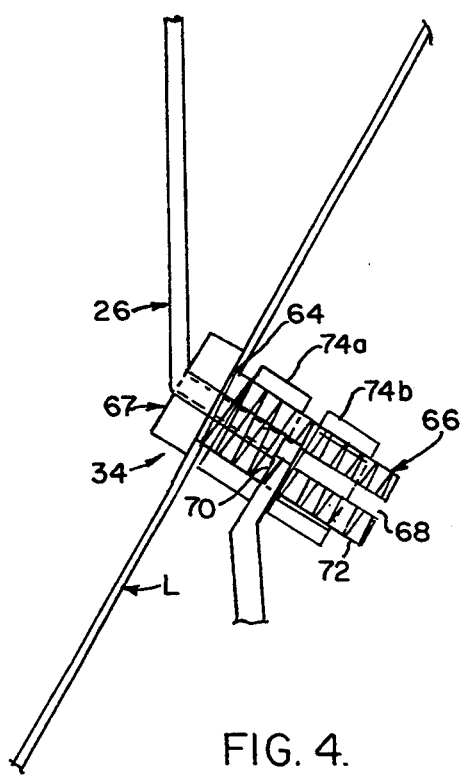
FIG. 4 is an elevational view of a weight guide line anchor of the indicator installed on the bin.
Figure 5A:
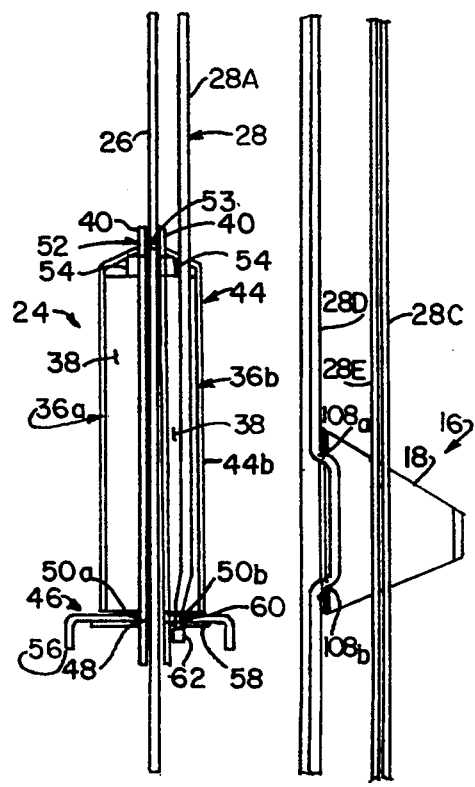
FIG. 5A is a partial sectional view of the bin illustrating a guide weight and frame installed in the bin, and a flag located outside the bin for indicating bin fill level.

Referring again to FIG., 2, cable 26 is attached to the bin at its upper and lower ends and extends vertically through the bin. The cable is spaced sufficiently far from the sidewall of bin section C so that the weight assembly does not contact the sidewall as it moves up and down within the bin. As shown in FIGS. 2 and 4, the lower end of cable 26 is connected to the anchor 34. The anchor is mounted to the side of lower section L of the bin near the upper end of the section. A hole 64 is bored in the side of section L, and a threaded bolt 66 of the anchor is inserted trough the hole. The inner end of the bolt has a head 67 of larger diameter than hole 64 to keep the anchor in place. The bolt has a longitudinal bore 68 through which the lower end of the cable is inserted. The bolt further has a lateral bore 70 intersecting bore 68 at approximately the midpoint of the threaded shank 72 of the bore. The lower end of the cable is drawn out of the anchor through this opening. A first nut 74a is threaded onto shank 72 so that it is above the opening of bore 70. After the end of the cable is drawn through bore 70, a second nut 74b is threaded onto the shank. The two nuts are drawn together to squeeze cable 26 between them.

Figure 6A:
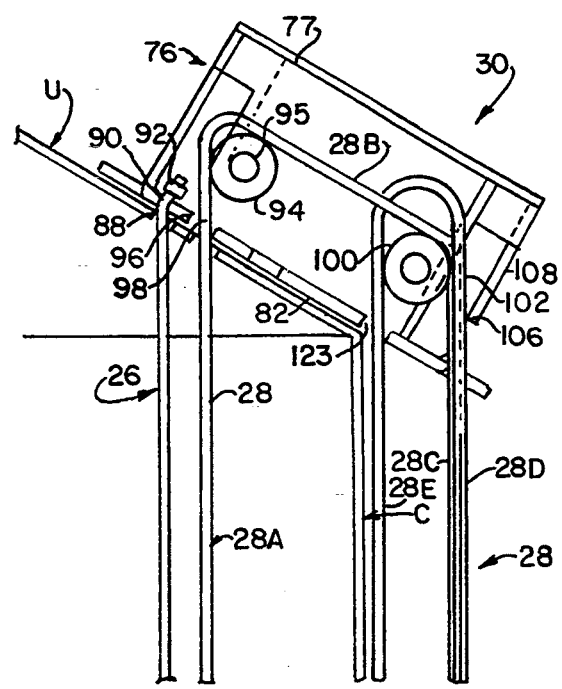
FIG. 6A is a sectional view of a first guide assembly which is installed on the eave of the bin.
Figure 6B:
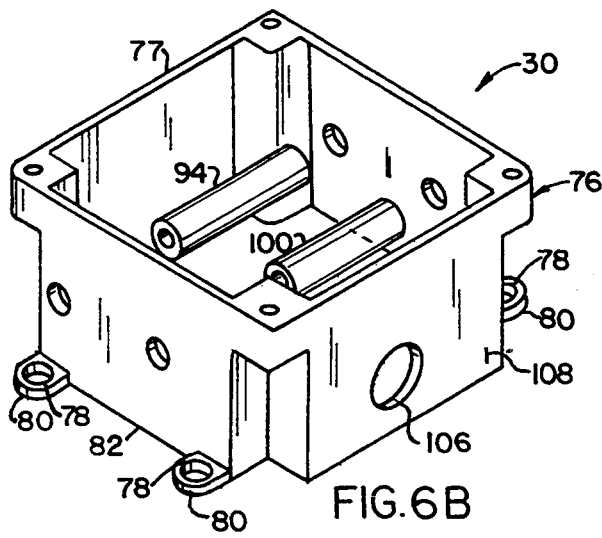
FIG. 6B is a perspective view of the assembly with its cover removed.
Figure 7:
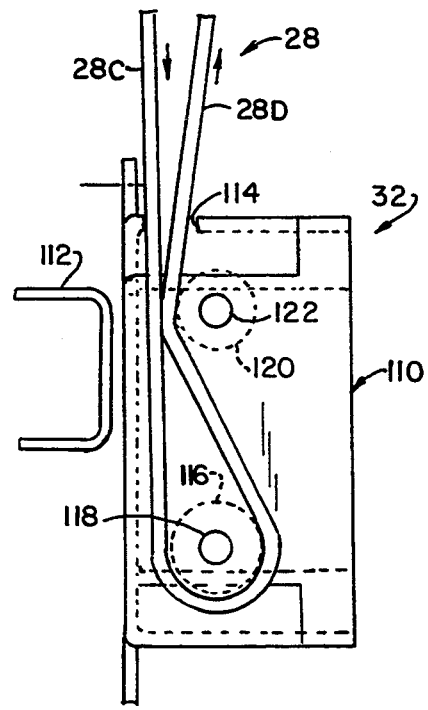
FIG. 7 is a sectional view of a second guide assembly which is installed at the base of the bin sidewall.

Referring to FIGS. 6A and 6B, upper guide assembly 30 includes a housing 76. This housing is installed to upper bin section U at the eave of the section. The housing comprises a rectangular box 77 which is made of a lightweight material. When mounted on section U, the front end of the box overhangs the side of bin section C for cable 28 to be routed through the housing as described hereinafter. The box is installed using bolts which is inserted through respective openings 78 in lugs 80 formed at base 82 of the box. Openings are formed in section U for the bolts, and nuts capture the bolts in place. As shown in FIG. 6A, a second opening 88 is formed in the bottom of the box, toward the upper end of the box as viewed in its installed position. The upper end of guide cable 26 fits through an opening 88 in section U, and through an opening 90 in the bottom of the housing. A cable clamp 92 locks this end of the cable in place. Again it will be understood that if the cable is a rope, the end of the rope can be knotted to secure it in place. It will also be understood that in making hole 64 in lower bin section L, the hole is located so as to be directly below hole 88. This allows guide cable 26 to hang vertically when installed in the bin. This, in turn, allows weight assembly 24 to move vertically and not be shifted one way or the other by movement of the feed on which base 46 of the weight assembly rests.

In addition to providing an installation point for the upper end of the guide cable, housing 76 also allows for the installation of two guides. A first roller 94 is rotatably mounted, on a shaft 95, toward the upper end of box 77 as viewed in FIG. 6A. An opening 96 is formed in the bottom of box 77 directly below the roller, and a corresponding opening 98 is made in section U. An inner reach 28A of cable 28; i.e., that portion of the cable extending upwardly through the bin from its end connected to weight assembly 24, extends through openings 98, 96 and is wound around guide 94.

A second and forward roller 100 is installed in housing 76 and is rotatably mounted on a shaft 102. After looping over rear guide 94, a second and short reach 28B of cable 28 is located within housing 76 and at the end of this reach, the cable fits over guide 100. As shown in FIG. 6B, an opening 106 is formed in front face 108 of housing 76. A third reach 28C of cable 28 which extends down the outside of the bin exits the housing through this slot.

Figure 5B:
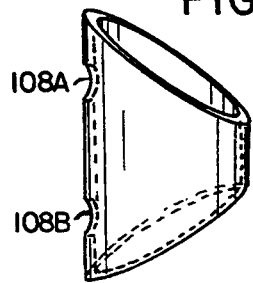
FIG. 5B is a perspective view of the flag.

Referring to FIG. 5B, flag 18 is shown to be generally trapezoidal in shape, the shape being somewhat like a pennant whose tapering outer end is truncated. The flag is made of injection molded or extruded material. Also, the flag is brightly colored, the color being a contrasting color to that of the bin. This lets the flag be easily seen from a distance so the bin fill level is discernable without having to get close to the bin. The larger end of the flag has upper and lower openings 108A, 108B for cable 28 so the flag is captured on the cable and can be raised and lowered by movement of the cable. The sleeve is hollow for the other reach of cable 28 be inserted through the flag (see FIG. 5A). This routing of both cable reaches 28C and 28D through the cable prevents the cable from being tangled with something else.

At the lower end of the descending reach 28C of cable 28, the cable enters a housing 110 of second guide assembly 32. Housing 110 is a rectangular box shaped housing made of a galvanized steel, a plastic, or another lightweight but sturdy material. As shown in FIG. 1, an arm 112 extends outwardly from the right hand stanchion V shown in the FIG. Housing 110 is secured to the outer end of this arm, by bolting it to the end of the arm, or by another convenient means. The length of arm 112 is such that when the housing is installed on the end of the arm, cable 28 will depend vertically from housing 77 of first guide means 30. It will be understood that housing 110 could be attached to the bottom of bin section C, if so desired. Cable 28 enters and exits housing 110 through a slot 114 formed in the top of the housing. A roller 116 is rotatably mounted on a shaft 118. The roller is installed at the base of the housing for cable 28 to extend substantially the length of the housing before being wound around the roller. A guide roller 120 is rotatably mounted on a shaft 122 at the upper end of the housing. The return or ascending reach 28D of cable 28, i.e., curves about this guide roller as it extends upwardly to exit through slot 114. Roller 120 positions the cable to exit housing 110 through slot 114 so the cable does not bear against the side of the slot and wear. Rollers 116 and 120, like rollers 94 and 100, are made, for example, of a PVC or similar lightweight, but rugged material. Also, it will be understood that pulleys may be used in place of the various rollers to achieve the same result.

As shown in FIGS. 8A and 8B, flag 18 is attached to cable 28 along its return reach 28D. At first guide means 30, return reach 23D of the cable re-enters housing 76 through opening 106 and loops over pulley 100 again. The looped end of the cable then exits the housing through a slot 123 formed in housing base 82. A clip 124 (see FIG. 2 is then used to attach this end 28E of the cable to cable reach 28D. It will be seen that reaches 28C-28D actually form a loop in which flag 18 is connected. Operationally, as the level of feed F in the bin is lowered, weight assembly 24 falls with it. Accordingly, reach 28A of the cable moves downward. Reach 28B of the cable moves leftward as shown in the FIG. Reach 28C moves upward. Reach 28D, which parallels reach 28C and to which flag 18 is attached, correspondingly moves downward. By properly measuring the height of the bin, and by appropriately locating housing 77 and 110, the lengths of the various cable reaches will be such that the position of flag 18 on the outside of the bin corresponds to the position of weight assembly 24 inside the bin.

When bin B is being filled, weight assembly 24 is hoisted to the upper end of the bin. This also causes flag 18 to be hoisted to its uppermost position. A second clip 126 (see FIG. 2) can be used to temporarily clip together cable 28 reaches 28C and 28D. The clip is applied where cable 28 enters and exits housing 110. Application of the clip locks the weight assembly in its raised position. After the bin is filled, the clip is removed. Now, the position of the weight assembly and flag correspond to the full condition of the bin. Thereafter, as the bin empties, the fall of the weight assembly lowers the flag position as described above.

In use, if an operator want to check the feed level in bin B, the operator grasps rope 28 and moves the rope so as to move flag 18 upwardly. This ensures that weight 24 is also moved upwardly so that it bears against the surface of the feed in the tank. Since the flag moves with the weight, when the rope can no longer be moved, the weight will be in contact with the feed thus the flag 18 indicates the level of the feed in the tank. If during a filling operation the weight 24 becomes buried, the operator may raise the weight by operating ropes 28 to move flag 18 to the top of the bin eave. Due to the tapered shape of the upper end of weight 24, it will permit it to be raised up through the feed. However, weight 24 is provided with feet or washer flare 56 on its bottom to engage the exposed upper surface of the feed and to prevent the weight from being buried in the feed, As previously mentioned, bin fill indicator means 14 is primarily used during a filling operation to indicate when bin B is substantially filled. Again, this is done to prevent spillage of feed. Means 14 first includes the visual indicator means 20 which is the rod or wand 22 positioned externally of the bin. As shown in FIG. 10, and described hereinafter, the wand is movable through a range of positions as the bin fills. The wand moves in a clockwise direction during filling from a generally eight o'clock position to a twelve o'clock position. It will be understood that means 14 does not provide a visual indication throughout the entire change in bin fill level. Rather, this is provided by the above described means 12. Means 14 only provides an indication during the "topping off" portion of a filling operation. Referring to FIG. 10, indicator wand 22 will be in its dashed line eight o'clock position N1 so long as the fill level is below the lower end of upper bin section U. As a practical matter, this will be most of the time. During filling, when the upper section C of bin B becomes nearly filled with feed, the wand begins to move from its first position. When the bin is filled, the wand is at its solid line twelve o'clock position N3. Referring to FIG. 1, wand 22 is seen at its upright position to be well below the level of inlet I. This prevents the wand from interfering with the auger conveyor used for filling the bin, and vice versa.

Figure 11:
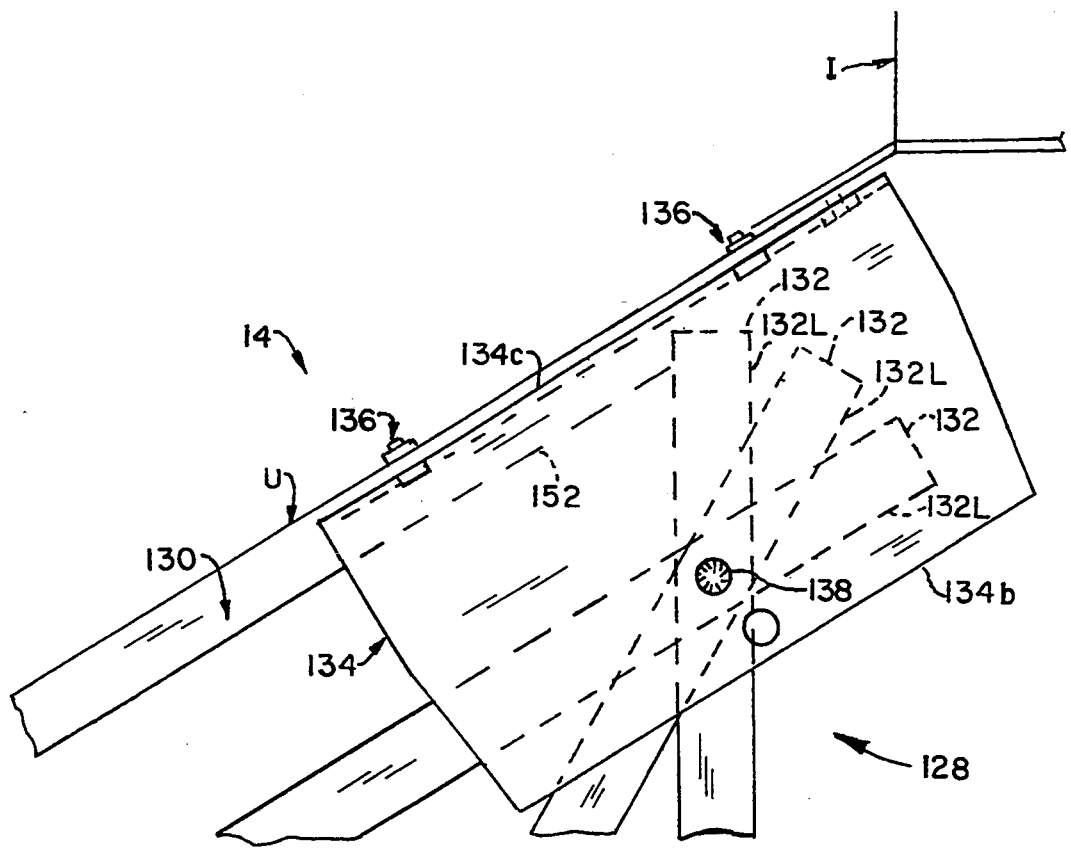
FIG. 11 is a sectional view of a housing in which the paddle is pivotally mounted for movement by the feed being delivered into the bin; and, FIG. 12 is sectional view of a shaft and its housing located on the outside of the bin, the shaft being used to move a bin fill indicator in response to movement of the paddle.
Figure 12:
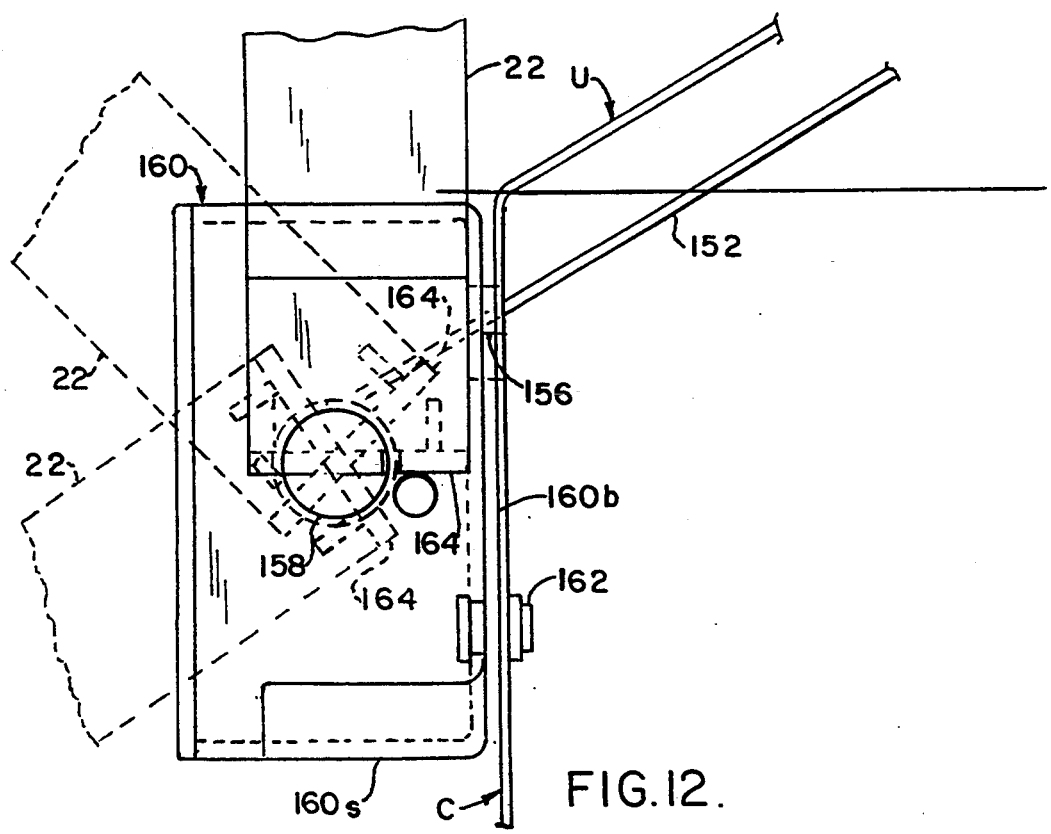

A paddle 128 (FIG. 10) is pivotally mounted on the inside of the bin roof proximate the peak thereof and is responsive to an increasing level of feed in the bin as it is being filled. A cable means 130 extends between paddle 128 and wand 22 to move the wand as the paddle means moves. Again, the cable can be rope, wire, or chain. Paddle 128 includes a bar 132 which is shown in the drawings to be an elongate rectangular bar. In FIG. 10, the bar is shown to be a thick bar; while in FIG. 9, the bar is shown to be much wider than it is thick. In FIG. 1, it is seen that bar 132 could be substantially longer without contacting the sidewall of bin section C. The length of the bar, if longer, would mean means 14 would provide filling indications for a longer portion of a filling operation. The bar is fabricated of wood, or a lightweight metal or plastic material. A frame or housing 134 is mounted inside the bin to the underside of the roof defined by the upper section U of the bin. Frame 134 has an inverted U-shape and is installed through bin inlet I. As shown in FIG. 10, the upper end of the frame is immediately adjacent the inlet. The frame is mounted in place using nut and bolt assemblies 136 as seen in FIGS. 10 and 11. It will be understood that other methods of attachment could also be used. One end of bar 132 is pivotally mounted in frame 134 by a rod 138. The rod extends transversely through bar 132 and the ends of the rod are captured in respective sidewalls 134*a* and 134*b* of the frame. The pivot point established for bar 132 by rod 138 is shown in FIGS. 9 and 10 to be off-center of the length of the bar. When installed, the shorter end of the bar, as measured from its pivot, fits within frame 134. As shown in FIGS. 9 and 10, when paddle 128 is at its N1 position, bar 132 depends vertically from the frame. At that time, the short end of the bar does not contact the base 134*c* of the frame.

A paddle blade 140 is attached to the opposite end of bar 132 and extends transversely of the bar. The blade 140 is made of a lightweight metal or plastic and has a modified C-shape when viewed in profile as in FIG. 10. As such, blade 140 has a first section 140a which abuts the lower face 132l of the bar. Section 140a extends the length of the paddle, but is a thin section. Blade 140 has a middle section 140b which is angled with respect to section 140a so the blade depends away from the underside of bar 132. Section 140b also extends the length of the blade, and the section is wider than section 140a. Lastly, the blade has a third section 140 which angles away from section 140b in the same direction section 140b angles away from section 140a. Section 140c is a narrower section than section 140b, and this outer section of the blade comprises the portion of the blade most in contact with the feed pouring into, and collecting in, the bin. Feed impacting blade section 140c, or rising up in the bin and contacting the blade, effect pivoting of bar 132 about its pivot in a clockwise direction as viewed in the drawings. Referring to FIG. 9, blade 140 is seen to be wider than the diameter of the inlet. This means that during filling, the feed cannot spout beyond the width of the blade.

The fact that the width of blade 140 greatly exceeds that of bar 132 means the paddle has a large surface area for contact by and with the feed. Because of this disparity in width, build up in feed in one part of the bin could mean that potentially damaging twisting forces could be exerted on the paddle. To prevent damage, reinforcing means 142 are used. Means 142 comprises a pair of triangularly shaped ribs 144 and 146 each of which is attached to bottom 132l of the bar. Referring to FIG. 9, the respective ribs are positioned between blade 140 and the bar. The side abutting the bottom of the bar extends approximately one-half the length of the bar. The side of the rib contacting the paddle extends substantially the length of the paddle from the respective side of the bar to the outer end of the paddle. This side of the rib is attached to paddle section 140a. Each rib is connected to the outer end of section 140a by a rivet or similar attachment 148. The inner end of this side of the rib is also attached to section 140a along the respective side edge of the bar. This attachment is by screws 150, for example. Additional screws 150 are used to secure the third side of the rib to the respective side of bar 132. With regard to the reinforcements, it will be understood that the reinforcements could be integrally formed with the bar and would comprise webs of material extending from the bottom of the bar at a diagonal to its sides. Also, it will be understood that the reinforcement could also be a single trapezoidal shaped piece which would be secured to the bar and paddle section 140a in the same manner as described above. Also, the reinforcements do not have to be triangular in shape. Other convenient patterns will also provide sufficient reinforcement of the paddle. Lastly, the reinforcements do not have to be used if the installer of the apparatus does not believe they are necessary.

Cable means 130 includes a cable 152 one end of which is connected to the shorter end of the bar 132, i.e., the end opposite that to which the paddle blade is attached. Cable 152 can be a rope, wire, or chain. Bar 132 has a hole 154 through its end to which the cable is attached. The diameter of the hole corresponds to that of the cable, wire, or chain. Attachment of the cable means to the bar is achieved in any convenient manner. If a rope is used, the end pulled through the hole can be simply knotted, or a clamp similar to clamp 62 can be used. If a wire is used, the end pulled through the hole can be twisted about the length of the wire, or, again a clamp can be used. For a wire, a link at the end pulled through the hole can be opened and then closed about a link on the outer end of the hole to form a closed loop of chain.

Regardless, the other end of the cable extends along the underside of the roof and exits through an opening 156 formed in the sidewall of the center section C of the bin, just beneath the eave of the roof. The end of the cable is then wrapped about a shaft 158. Shaft 158 is rotatably mounted in a housing 160 which is secured to the sidewall of the bin by bolts 162. Housing 160 has a base 160b with openings for the bolts, and a circumferentially extending sidewall 160s. The outer face of the housing is open to accommodate movement of indicator 22. As with housings 76 and 110, and frame 134, housing 160 is of a lightweight metal or plastic material.

Shaft 158 is journalled for rotation in opposite sides of sidewall 160s. The outer end of the cable, wire, or chain is wrapped about the shaft and the outer end of the cable means is secured to the shaft in any appropriate manner. Indicator 22 has a base plate 164 which is attached to shaft 158. The base plate can be integrally formed with the shaft. The body of the indicator is fitted onto the base plate, by screws, for example. This permits the indicator to be easily replaced if it is damaged by wind, blowing dirt or debris, etc.

In operation, when the bin is substantially empty, the level of feed in the bin is substantially below that of paddle 140, and bar 132 is in its vertical position N1. Indicator 22 is at its eight o'clock position at this time. As best shown in FIG. 1, in position N1, the lower end of the blade is at the level of the upper end of bin center section C. As the bin is filled, and the level of feed rises, the feed will form an inverted cone whose tip is toward inlet I. When the level of feed reaches the top of this center section, the feed falling down the side of the cone falls against the paddle. Because of its C-shape, the paddle is functions like a scoop. Feed scooping into the paddle forces the paddles to move clockwise, as seen in the drawings. This, in turn, rotates bar 132 about its pivot and pulls upwardly on the cable. Cable 152 unwinds from shaft 158, rotating the shaft clockwise. Rotation of the shaft moves wand 22 clockwise from its eight o'clock position. As the wand reaches its vertical, twelve o'clock position, it signals to the operator of the feed conveyor that the bin is substantially full. The operator then shuts off the conveyor so there is no spillage. Thereafter, as feed is removed through outlet O, paddle 140 will track the falling level of grain until it falls below the top of bin section C. From there, means 12 will track the falling level of grain with the position of flag 18 along the side of the bin indicating the level of feed. Though not shown, a spring, or other similar device is installed in housing 160. When wand 22 reaches its vertical position, it contacts the spring. The spring prevents the wand from moving to an over-center position from which it could not return as the bin level starts to fall.

It is a feature of apparatus 10 that both means 12 and 14 can be readily installed or retrofitted in the bin or to its sides. Thus, as described above, the various housings are attachable to the sidewall of section C and simply require attachment by nuts and bolts, or screws. Frame 134 of means 214 is readily attached to the roof of the bin since it is affixed to the roof immediately adjacent inlet I. The weight assembly of means 12 can be assembled outside the bin and then lowered in place through the inlet. Not only does all of this make it easy to install the apparatus, but it also makes it easy to effect repairs, or replace damaged pieces. Since flag 18 and wand 22 are both located outside the bin, they may be damaged by wind and blowing debris. In any event, they are readily replaced. Similarly, if one of the housings 76, 110, or 160 are damaged, they, too, are easily replaced. On feed lots or farms where there are many bins, simplicity of installation and upkeep are important, as is the ability to quickly ascertain the feed level in the various bins so an adequate supply of feed is kept on hand.

What has been described is fill indicator apparatus for use in feed bins to provide an observable indication of the level of material in the bin. The apparatus is easily installed in the bin, and other types of bulk storage containers, without someone having to get into the bin or container. The apparatus promptly shows changes in the feed level in the bin as the bin is emptied and filled. The apparatus includes two indicators one of which is used to indicate the level of feed when the bin is filled, and the other of which indicates the level of feed as the bin is emptied. These indications are based on the angle of repose of feed in the bin. The indicators are large, visual indicators such as flags or wands which can be readily seen at a distance. The indicators are sturdy enough not be effected by the elements, and dust and dirt. While relatively inexpensive, use of the apparatus saves the user time and expense by providing feed level information by which he knows when the is sufficiently low so the bin should be refilled; and when the bin is substantially full, during refilling, so the bin is not over filled with a consequent spillage. Finally, the materials used are such as to not react with the feed. Thus, their usage is not potentially harmful to the animals ingesting the feed.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. Fill indicator apparatus for use in a storage container to indicate the level to which the container is filled with a material comprising:

first visual indicator means for indicating the level of said material within said container including a first visual indicator adapted to be positioned externally of the container and movable relative to a side of the container, said first indicator means is further adapted to be movable relative to the container to a reference position when the container is filled, and said first indicator means being adapted to be subsequently movable from one position to another as material is removed from the container whereby the subsequent position of said first indicator means represents the level of material remaining; and, second and separate visual indicator means including a second visual indicator adapted to be positioned externally of the container and responsive to an increasing level of material in the container, as the container is being filled, to provide a visual indication of the level to which the container is filled thereby to prevent the container from being overly filled.

2. The apparatus of claim 1 wherein one of the visual indicators is movable linearly with respect to the side of the container, and the other visual indicator is movable rotably with respect thereto.

3. The apparatus of claim 2 wherein the first visual indicator is movable linearly with respect to the side of the container, and the second visual indicator is rotatably movable with respect thereto.

4. The apparatus of claim 3 wherein said first visual indicator means includes weight means adapted to be positioned within the container and movable as the level of material in the container changes for moving said first visual indicator responsive to decreases in the level of the material.

5. The apparatus of claim 4 wherein said weight means includes a weight resting atop the material in the container and supported thereby.

6. The apparatus of claim 5 further including guide means adapted to be attached to the container for guiding movement of the weight.

7. The apparatus of claim 6 wherein the weight is mounted in a frame, and the guide means comprises a cable extending through the frame with each end of the cable adapted to be attached to a side of the container.

8. The apparatus of claim 4 wherein said moving means includes a cable to which both the weight means and said first indicator means are attached.

9. The apparatus of claim 8 wherein said weight means includes a weight mounted in a frame, and wherein said cable includes one end attached to the frame and a second end adapted to be attached to the side of the container, said first indicator means including a flag attached to said cable between the frame and said second end of the cable.

10. The apparatus of claim 9 further including first roller means for rotatably supporting said cable interposed between the frame and the flag, said cable being routed through said first roller means.

11. The apparatus of claim 10 further including second roller means for rotatably supporting said cable interposed between the flag and the other end of said cable, said cable also being routed through said second roller means.

12. The apparatus of claim 11 wherein the first roller means comprises a plurality of rollers with the cable being routed from said first roller means through said second roller means and back through said first roller means, whereby said cable is routed through said first roller means twice.

13. The apparatus of claim 12 further including tie means for tying the second end of the cable to a length of said cable extending between said flag and said second roller means.

14. The apparatus of claim 13 further including clip means for clipping together a portion of said cable between said flag and said second roller means and a portion of said cable extending between said second roller means and said first roller means, whereby said cable can be moved to position the flag at a desired location prior to filling the container, said clip means being applied to the cable to prevent movement of said weight during filling, said clip means then being removed from the cable after the filling for the weight to move as the container is emptied and move the flag accordingly.

15. The apparatus of claim 12 further including a housing for each of the roller means, said housings being adapted to be mounted externally of the container.

16. The apparatus of claim 3 wherein said second visual indicator means includes a paddle adapted to be pivotally mounted inside the container, and a cable extending between the paddle and said second visual indicator.

17. The apparatus of claim 16 wherein the paddle includes a bar and a paddle blade attached to one end of the bar, said blade contacting material filling the container to move the bar.

18. The apparatus of claim 17 further including a rod extending transversely through the bar for the bar to pivot thereabout, a pivot point for the bar being off-center of the length thereof such that said bar has a long end and a short end.

19. The apparatus of claim 18 further including a frame adapted to be mounted within the container for supporting said rod.

20. The apparatus of claim 17 wherein the blade has a first section abutting one face of the bar, a second section angled with respect to said first section, and a third section angled with respect to said second section, said second and third section being angled so as to contact material with which the container is being filled and be moved thereby, movement of the paddle causing rotation of the bar about its pivot.

21. The apparatus of claim 20 wherein the width of the paddle blade exceeds the width of the bar to improve contact between the blade and the material, and the apparatus further includes support means attached to the bar and the blade to support the blade.

22. The apparatus of claim 18 further including a second cable, one end of which is attached to the shorter end of the bar.

23. The apparatus of claim 22 wherein said second visual indicator means comprises a wand one end of which is attached to a shaft.

24. The apparatus of claim 23 wherein said second cable has another end which is wrapped about said shaft to rotate the shaft as the bar is rotated about its pivot.

25. The apparatus of claim 24 wherein the wand is attached to the shaft and is adapted to be positioned adjacent a side of the container prior to the container being filled, pivoting of the bar by the blade as the container fills producing a rotation of the shaft in the direction to rotate the wand away from said side.

26. Fill indicator apparatus for use in a bulk feed bin to indicate the level to which the bin is filled with feed comprising:
a visual indicator adapted to be positioned externally of the bin and linearly movable relative to a side of the bin;
weight means adapted to be positioned in the bin atop the feed and movable with the level of feed in the bin for causing said indicator to move; and,
cable means for interconnecting the weight means and the visual indicator for moving the indicator as the weight means moves, said cable means being operable to move the weight means and visual indicator to a first position when the bin is being filled for the weight means thereafter to move as the level of feed changes and to change the position of the indicator accordingly.

27. The apparatus of claim 26 wherein said weight means includes a weight, the cable means includes a cable having one end attached to the weight and a second end attached to said cable intermediate said one end and said second end, and the visual indicator includes a flag attached to the cable, the cable being arranged in a looped configuration whereby movement of the weight as the level of feed in bin changes produces a corresponding movement of the flag in the same direction.

28. The apparatus of claim 27 wherein the weight means further includes a frame in which the weight is mounted, said frame having a base resting upon the top of the feed so the weight is supported by the feed, the weight moving, by gravity, as feed is withdrawn from the bin.

29. The apparatus of claim 27 further including guide means attachable to the bin for guiding movement of the weight.

30. The apparatus of claim 29 wherein the guide means comprises a second cable extending through the frame with each end of the second cable bang attachable to a side of the container.

31. The apparatus of claim 29 further including first roller means for rotably supporting said cable interposed between the frame and the flag, said cable being routed through said first roller means.

32. The apparatus of claim 31 further including second roller means for rotatably supporting said cable interposed between the flag and the other end of said cable, said cable also being routed around said second roller means.

33. The apparatus of claim 32 wherein the first roller means comprises a plurality of rollers with the cable being routed from said first roller means through said second roller means and back through said first roller means, whereby said cable is routed through said first roller means twice.

34. The apparatus of claim 33 further including tie means for tying the second end of the cable to a portion of said cable extending between said flag and said second roller means.

35. The apparatus of claim 34 further including clip means for clipping together a portion of said cable extending between said flag and said second roller means and a portion of said cable extending between said second roller means and said first roller means, whereby said cable can be moved to position the flag at a desired location prior to filling the bin, said clip means being applied to the cable to prevent movement of said weight during filling, said clip means then being removed from the cable after the filling for the weight to move as the bin is emptied and move the flag accordingly.

36. The apparatus of claim 32 further including a housing for each of the roller means, said housings being adapted to be mounted externally of the bin.

37. Fill indicator apparatus for use in a bulk feed bin to indicate when the bin is substantially filled with a feed during a bin fill operation comprising:
visual indicator means including a visual indicator adapted to be positioned externally of the bin to provide a visual indication when the bin substantially filled;
paddle means for detecting feed level adapted to be pivotally mounted inside the bin and responsive to an increasing level of feed in the bin as it is being filled, said paddle means includes a bar, a rod extending transversely through the bar for the bar to pivot thereabout, a pivot point for the bar being off-center of the length thereof, and a paddle blade attached to one end of the bar, said blade contacting the feed filling the bin and being movable thereby to effect pivoting of the bar;

a frame adapted to be mounted within the bin and supporting the ends of the rod, and;

cable means extending between the paddle means and the visual indicator to move the indicator as the paddle means moves and thereby provide a visual indication of the level to which the bin is filled to prevent the bin from being overly filled.

38. The apparatus of claim 37 wherein one end of the blade abuts one face of the bar and the other end of the blade is angled away from the bar to contact the feed and be moved thereby.

39. The apparatus of claim 38 wherein the width of the paddle blade exceeds the width of the bar to improve contact between the blade and the feed.

40. The apparatus of claim 37 wherein said bar has a short end and a long end relative to said off-center pivot point, and wherein said cable means includes a cable, one end of which is connected to said short end of the bar as measured from the pivot.

41. The apparatus of claim 40 wherein said visual indicator means comprises a wand, one end of which is attached to a shaft.

42. The apparatus of claim 41 wherein said cable has another end portion which is wrapped about said shaft to rotate the shaft as the bar is rotated about its pivot.

43. The apparatus of claim 42 wherein the wand is attached to the shaft and adapted to be positioned adjacent a side of the bin prior to the bin being filled, pivoting of the bar by the blade as the bin is filled producing rotation of the shaft in a direction to rotate the wand away from said side.

44. The apparatus of claim 24 further including a housing in which the shaft is installed, the housing adapted to be located on the outside of the bin.

45. A method of providing a visual indication of the level of feed remaining in a bulk feed bin and of providing another visual indication that said bin is substantially filled with feed during an operation of filling said bin with feed so that the filling operation can be stopped prior to overfilling said bin comprising:

positioning a first visual indicator at a reference position representing a bin filled condition prior to the bin being filled, said first indicator being located externally of the bin and being movable relative to said bin responsive to means for moving said first visual indicator as the feed is emptied from said bin so as to indicate the level of feed remaining in said bin;

filling the bin with feed until the bin is substantially full;

providing a second visual indicator on the exterior of said bin for visually indicating when said bin is substantially filled responsive to means for moving said second visual indicator so the filling of the bin can be terminated when the bin is substantially full;

emptying the feed from the bin; and, in response to said feed being emptied from said bin, effecting the movement of said first visual indicator from said reference position to other positions as the feed is emptied from the bin whereby the subsequent position of said first visual indicator represents the level of feed remaining in the bin.

46. The method of claim 45 wherein moving said first visual indicator includes moving the indicator linearly with respect to the side of the bin; and, wherein visually indicating with the second visual indicator includes rotatably moving said second visual indicator with respect to the side of the bin.

47. The method of claim 45 wherein the means for moving said first indicator includes a weight inside the bin connected to said first visual indicator which comprises a flag outside the bin, and wherein moving the first indicator includes resting the weight on top of the feed for the weight to fall as the level of feed in the bin falls, movement of the weight producing a corresponding movement of the flag.

48. The method of claim 47 further including guiding the movement of the weight as it moves inside the bin.

49. The method of claim 47 wherein movement of the weight producing a corresponding movement of the flag includes connecting the weight and the flag to a cable, said cable having ends;

forming said cable in a loop;

routing the cable over a first roller means with the weight being connected to the cable intermediate one end of the cable and the first roller means;

further routing the cable between the first roller means and a second roller means with the flag being attached to the cable at a point intermediate the roller means; and, rerouting the cable from the second roller means back through the first roller means and attaching the cable to that portion of said cable to which the flag is attached.

50. The method of claim 45 wherein visually indicating with the second visual indicator includes pivotally mounting a paddle in the bin;

contacting the paddle with the feed as feed level in the bin rises so the paddle is rotated about a pivot; and, rotatably connecting the paddle with the second visual indicator for movement of the paddle to produce a rotational movement of the second visual indicator.

51. The method of claim 50 wherein the paddle includes a pivotally mounted bar, and a paddle blade attached to one end of the bar, and the method further includes permitting said paddle and said bar to pivot about a pivot axis in response to the paddle engaging feed within said bin as feed is loaded therein or is removed therefrom such that as the angle of repose of the feed in contact with said paddle changes as the bin fills or empties, the paddle rotates between a generally vertical position in response to the feed in the bin being clear of said paddle and thus indicating that the bin is not full to a generally horizontal position in response to the feed being in engagement with said paddle thus indicating that the bin is substantially full.

52. The method of claim 51 wherein said bar is pivoted off-center with relation to the length of said bar, said bar having a long end and a short end relative to an off-center pivot point, and wherein the step of rotatably connecting the paddle to the second visual indicator includes connecting a cable to the short end of the bar and to said second visual indicator.

53. The method of claim 52 wherein said second visual indicator comprises a wand mounted on a shaft, said method includes pivotally mounting the shaft carrying said wand such that prior to filing the bin, the wand is disposed at a first position in which it is at a first angle with respect to a sidewall of the bin, and as the bin is filled and the paddle is rotated by the feed, and the wand which is interconnected to said paddle by said cable is rotated in a direction to rotate the wand to a second position in which the wand is at a second angle with respect thereto thereby to indicate that the bin is substantially full.

54. The method of claim 53 further including orienting the wand with respect to the side wall so when the bin is full, the wand extend generally vertically.

* * * * *